United States Patent [19]

Levine

[11] 4,315,160

[45] Feb. 9, 1982

[54] ANTI-THEFT CONTROL AND METHOD

[76] Inventor: Marc A. Levine, 17096 Chillicothe Rd., Chagrin Falls, Ohio 44022

[21] Appl. No.: 68,617

[22] Filed: Aug. 22, 1979

[51] Int. Cl.³ .............................................. B60R 25/00
[52] U.S. Cl. ................................. 307/10 AT; 180/287
[58] Field of Search .............. 307/10 AT; 340/63, 64; 180/287

[56] References Cited

U.S. PATENT DOCUMENTS

| | | | |
|---|---|---|---|
| 3,525,414 | 8/1970 | Copelan | 307/10 AT |
| 3,738,444 | 6/1973 | Roby | 307/10 AT X |
| 3,907,060 | 9/1975 | Burton et al. | 307/10 AT X |
| 3,986,166 | 10/1976 | Kohn | 307/10 AT X |
| 4,034,337 | 7/1977 | Haddock | 340/63 |

*Primary Examiner*—L. T. Hix
*Assistant Examiner*—James L. Dwyer

*Attorney, Agent, or Firm*—Maky, Renner, Otto & Boisselle

[57] ABSTRACT

An anti-theft control provides for the delivery indirectly and from a remote location a signal that causes enabling of the starter apparatus of a vehicle, for example, to start the vehicle engine. Thus, the major portion of the anti-theft control may be well hidden in the vehicle. The means for operating the anti-theft control by providing indirectly a signal thereto from a remote location may be, for example, a permanent magnet or an electromagnet which produce a magnetic field that can be directed to a switch or the like that closes in response to the magnetic field. Very importantly, such switch or like device in particular may be hidden within the vehicle seat, dashboard, door, console, roof covering fabric, etc. and ordinarily need never be exposed.

10 Claims, 4 Drawing Figures

ANTI-THEFT CONTROL AND METHOD

BACKGROUND OF THE INVENTION

The present invention relates generally, as indicated, to an anti-theft control and, more particularly, to such a control and to a control method for preventing the starting of a vehicle engine, for example, unless appropriately authorized. As is described in greater detail below, such authorization is effected remotely and indirectly, for example, using a permanent magnet, an electromagnet, and/or a transmitter and receiver pair, all of which preferably may be utilized without directly exposing the anti-theft control.

Typically in automobiles, boats, and other vehicles the source of motive power or the principal source of power is provided by an engine, such as an internal combustion engine. A starter motor, which frequently is electrically driven, provides starting power for the engine when it is desired to start the same from a non-operational state. Moreover, conventionally a starting relay or solenoid may be energized by a relatively low power control signal from the starter portion of the vehicle ignition switch to supply the large current necessary to power the starter motor for, in turn, starting the vehicle engine.

Various devices have been used in the past to prevent vehicle theft. One such device has been a remotely located switch that would have to be pressed or thrown by the vehicle driver. However, such a switch would have to be exposed, for example directly on the dashboard or under the dashboard to enable the vehicle operator mechanically to throw the switch. Due to such exposure of the switch, an unauthorized person also frequently is able to locate such switch and to start the engine with facility. Other types of devices included key operated switches or digitally encoded key pad switches; but these, too, require exposure and in many instances may simply be broken exposing wires for mechanical connection by an experienced car thief, for example.

SUMMARY OF THE INVENTION

The present invention is directed to an anti-theft control for vehicles. Such anti-theft control provides for the delivery indirectly and from a remote location a signal that causes enabling of the starter apparatus of a vehicle, for example, to start the vehicle engine. Thus, the major portion of the anti-theft control may be well hidden in the vehicle. The means for operating the anti-theft control by providing indirectly a signal thereto from a remote location may be, for example, a permanent magnet or an electromagnet which produce a magnetic field that can be directed to a switch or the like that closes in response to the magnetic field. Very importantly, such switch or like device in particular may be hidden within the vehicle seat, dashboard, door, console, roof covering fabric, etc. and ordinarily need never be exposed. Using the invention according to the method thereof, the vehicle ignition switch may be turned to the start position while simultaneously the magnet, for example, is manually held in proximity to the magnetically responsive switch to cause the latter to close enabling starting of the vehicle engine.

In one embodiment the magnetically responsive switch provides power directly to a relay coil which closes its contacts to energize the starter relay. In another embodiment the magnetically responsive switch causes a triggerable member, such as an SCR or other thyristor to provide power to the starting relay of the vehicle. In a further embodiment a transmitter provides an electromagnetic signal that causes a receiver in the vehicle to operate the magnetically responsive switch, or like device, and in such embodiment, since the transmitter may be operated externally of the vehicle, the anti-theft control may both enable the starter relay for operation and disarm a burglar alarm. Further, in accordance with the invention a mounting assembly may be provided for the anti-theft control.

With the foregoing in mind, it is a primary object of the present invention to provide an anti-theft control for a vehicle or the like that is improved in the noted respects.

Another object is to provide an anti-theft control that may be well hidden in a vehicle.

An additional object is to provide a security method for controlling the starting function of a vehicle or the like.

A further object is to control the delivery of starting power from the power supply of the vehicle to the starter motor thereof as an anti-theft measure.

Still another object is to provide a strong, secure mounting structure for an anti-theft control.

Still an additional object is to provide an anti-theft control for a vehicle in which the starter power for the vehicle is controlled in response to a signal provided indirectly from a location remote from the anti-theft control, thus allowing the anti-theft control to be well hidden from view or other discovery.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail certain illustrative embodiments of the invention, these being indicative, however, of but several of the various ways in which the principles of the invention may be employed.

DETAILED DESCRIPTION OF INVENTION

Figure 1:
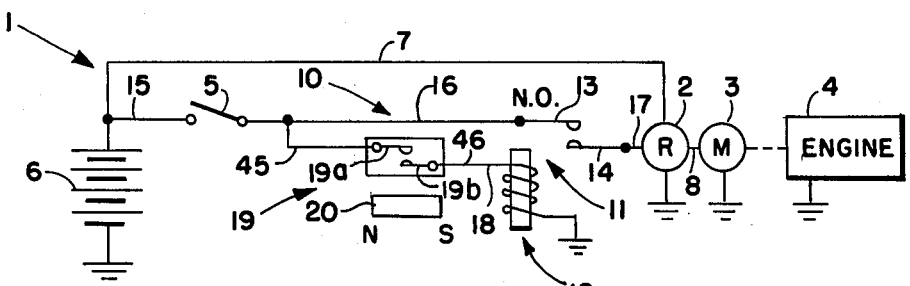
FIG. 1 is a schematic diagram of an anti-theft control in accordance with the preferred embodiment and best mode of the present invention.

Referring now in detail to the drawing, wherein like reference numerals designate like parts in the several figures, and initially to FIG. 1, an anti-theft control in accordance with the preferred embodiment and best mode of the present invention is indicated at 1 in FIG. 1. The anti-theft control is a secretive power control in that it can be secreted or hidden away in a vehicle and can be operated without direct visible or mechanical exposure thereof. In particular, the anti-theft control 1 functions as a security start controller for the vehicle, not shown, which typically has a conventional starter relay or solenoid 2 for selectively energizing a controllable starter motor 3 to start the vehicle engine 4 to provide a source of mechanical power, such as motive power, for the vehicle, when a start switch 5 is selectively closed by the vehicle operator. Such start switch 5 may be the spring loaded switch actuating and switch portion of a conventional ignition switch mechanism for a vehicle. In the past, while the switch 5 would be closed by the vehicle operator, control power from the vehicle power supply, such as a battery 6, would be delivered to the starter relay 2 which closes a set of contacts to provide a power signal, say via lines 7 and 8, to energize the starter motor 3.

According to the anti-theft control 1 of the present invention, a power control means 10 controls the delivery of power to the starter motor 3 when the start switch 5 is closed to prevent starting of the engine 4 until the power control means has been selectively actuated. As shown in FIG. 1, the power control means 10 includes a relay 11 having a conventional electromagnet or coil portion 12 and a set of normally open contacts 13, 14. Such contacts 13, 14 block delivery of a control signal via lines 15, 16 and 17, when the start switch 5 is closed, to the starter relay 2 to prevent closure of the starting set of contacts thereof. However, upon being energized by an activating signal at its input terminal 18, while the start switch 5 is closed, the relay 11 will conduct the control signal to the starter relay 2 causing the latter to deliver a power signal to the starter motor 3 to start the engine 4.

A selectively operable actuating means 19, which according to the preferred embodiment and best mode of the invention is a magnetically responsive reed relay switch, may receive an input, such as a magnetic signal, from an operating means, such as a magnet 20, to deliver, when the start switch 5 is closed, an activating signal to the relay 11. The reed switch 19 has a pair of contacts 19a, 19b, which close in response to application of a magnetic field from the magnet 20 to complete a circuit path from the power supply 6 to the terminal 18. It is important that the actuating means 19 and the operating means 20 therefor be cooperatively interrelated so that the latter may provide from a location spaced apart or remote from the former an appropriate input to cause activating of the relay 11, when the start switch 5 is closed, normally without directly engaging the reed switch 19. As a result, the reed switch 19 may be well hidden in the vehicle, say under the carpet, under the seat, in the dashboard, in the door, above the roof covering fabric, in a console, etc.

Therefore, in using the invention, particularly according to the method thereof, the anti-theft control provides security for the vehicle to prevent starting thereof by interrupting a connection between the battery 6 and the starter relay, or the starter motor if there is no relay used. By placing the magnet 20 into a position near but still remote from the reed switch 19 to deliver indirectly a signal to the latter, a connection is completed from the battery 6 to enable starting of the engine 4. In operation of the anti-theft control 1 it normally would be necessary to maintain the magnet 20 in proximity to the reed switch 19 during the entire starting duration while the start switch 5 is held closed to assure provision of power to the starter motor 3. There is an advantage achieved in the anti-theft control 1 in that the starting of the vehicle becomes somewhat difficult, for if the magnet 20 is moved before the engine has started, the starting action will terminate, thus making starting by a thief all the more difficult.

Figure 2:
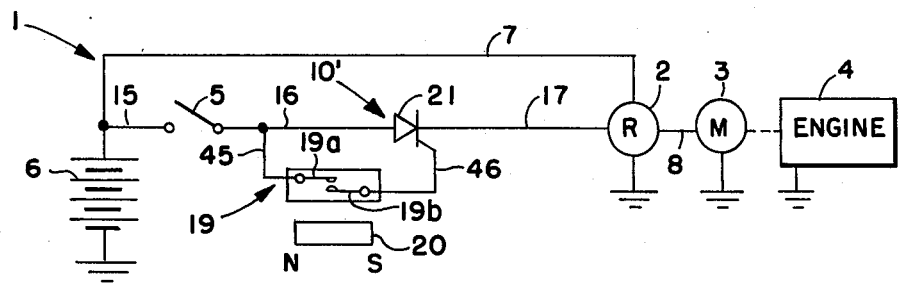
FIG. 2 is a schematic diagram of an alternate embodiment of the anti-theft control using a triggerable power control means.

Turning briefly to FIG. 2, a modified form of anti-theft control 1' is illustrated. In the anti-theft control 1' the power control means 10' comprises a triggerable circuit element 21, such as an SCR, which upon being triggered, say in response to a gating signal, remains conductive as long as power is supplied thereto, even though the gating signal may terminate. Such gating signal may be provided in response to closure of the reed switch 19 caused by proximate positioning of the magnet 20 thereto, thereby causing the SCR to provide a control signal to the starter relay 2 for starting the vehicle engine 4.

Moreover, there is an advantage to the control 1' of FIG. 2; with the start switch 5 held closed, the magnet 20 may be briefly placed near the reed switch 19 and then removed therefrom, for the SCR 21 will trigger to conduction promptly upon closure of the reed switch contacts 19a, 19b and will continue conducting, even after those contacts open, until the start switch 5 opens. Therefore, the vehicle operator simply may pass the magnet 20 briefly in proximity to the hidden reed switch 19 without actually revealing the location thereof so that the security afforded by the anti-theft control 1 will remain substantially intact.

Figure 3:
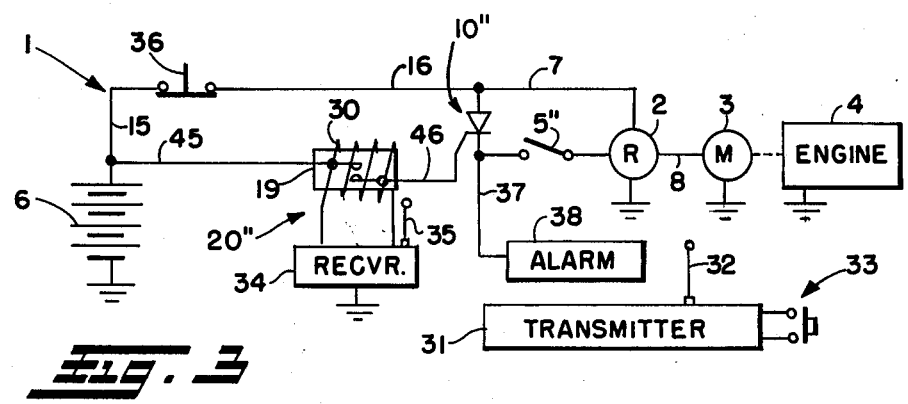
FIG. 3 is a schematic diagram of a further alternate embodiment of the anti-theft control using a transmitter and receiver.

Turning now to FIG. 3, the anti-theft control 1" is similar to the control 1 described above with reference to FIG. 1 except that the operating means 20" is of the electromagnetic type including a winding or coil 30 about the reed switch 19 selectively to provide a magnetic field to close the contacts of the reed switch. The operating means 20" also includes a transmitter 31, which produces an electromagnetic signal via an antenna 32, for example, when a pushbutton switch 33 is selectively closed by an operator, and a receiver 34 having an antenna 35. When the switch 33 is closed, the transmitter 31 produces a signal which causes the receiver 34 to provide a current in the winding 30 as a magnetic input to the reed switch 19 causing the contacts thereof to close, thereby providing an activating signal to the relay 11 or a gating signal to the SCR 21. With the start switch 5" closed and a normally closed reset switch 36 also closed, the power control means 10" will energize the starter relay 2 for starting the vehicle engine 4.

It will be appreciated that the transmitter 31 may be carried in the pocket of the vehicle operator and used to effect operation of the power control means 10" from outside the vehicle. However, to assure that the power control means 10" receives a power input, even while the start switch 5" is open, which would be its condition when the operator is outside the vehicle, the start switch 5" is not connected in the power circuit of the power control means 10"; rather, the start switch 5" is connected between the power control means and the starter relay 2. If desired, the output from the power control means 10" may be coupled via line 37 to a conventional electrical alarm apparatus 38 which could be activated, for example, when the reset switch 36 is selectively opened by the operator. The alarm 38 preferably would be of the type that finally becomes active when the operator, for example, leaves the vehicle and closes the door. Then, to disable the alarm 38 before the operator again opens the door, the transmitter switch 33 may be closed causing conduction through the power control means 10" so that a signal then is provided on line 37 to deactivate the alarm 38. In the embodiment illustrated in FIG. 3 the power control means 10" would be a triggerable element, such as an SCR, so that upon brief closure of switch 33 the start circuit would be and remain enabled and the alarm deactivated. If desired, a reset switch 36 may be provided to open the power circuit to the SCR.

The relay 11 of the anti-theft control 1 in FIG. 1 may be contained in an electrically non-conductive housing, say of plastic, for electrical insulation and for protection from damage.

Figure 4:
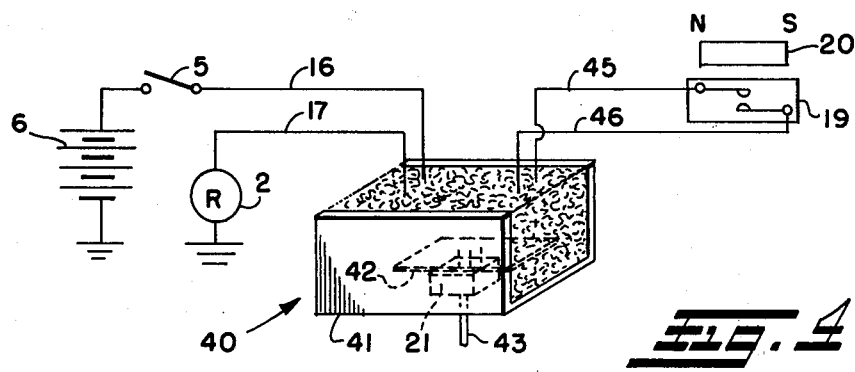
FIG. 4 is a combination schematic and perspective view of an anti-theft control in accordance with the invention.

Referring now briefly to FIG. 4, a mounting means 40 for containing and facilitating the mounting of the several anti-theft controls 1', 1" described above with reference to FIGS. 1-3, and particularly those using SCR's, is illustrated. The mounting means includes a U-shape channel 41, for example formed of an aluminum extrusion, containing part or all of the power control means and, in particular, the SCR 21 or, for example, a sealed relay 11, as well as possibly the receiver 34 and reed switch 19 of the embodiment illustrated in FIG. 3. The SCR 21, for example, may be mounted on a printed circuit board 42, have its mounting stud 43 protruding from an opening in the bottom of the channel 41, and be fully secured within the channel by conventional electrically non-conductive potting material, such as epoxy. The channel 41 preferably is thermally conductive to provide a good heat sink function for the SCR 21 and may be mounted, as desired, in the vehicle. Moreover, several leads 45, 46 couple the reed switch 19 to the SCR 21 allowing the switch 19 to be located remotely of the mounting means 40. Similarly, leads 16, 17 extend from the mounting means 40 to the start switch 5 and to the starter relay 2, as shown.

With the foregoing in mind, it will be appreciated that the anti-theft control 1 and the alternate embodiments may be coupled in a conventional vehicle by interrupting the usual circuit from the start switch 5 to the starter relay 2 and coupling the interrupted circuit leads from the start switch 5 to lead 16 and from the starter relay 2 to lead 17. The mounting means 40 may be securely mounted in the vehicle at any convenient location. Moreover, the selectively operable actuating means 19, preferably a reed switch, may be positioned at any desired hidden and secret location in the vehicle reasonably accessible to receive an input, either by a magnet, the transmitter, or any other equivalent means without full disclosure of the hiding place.

I claim:

1. A secretive power controller for a vehicle or the like having controllable starter means for starting the vehicle source of mechanical power, such starter means including a starter motor means energizable for starting the source of mechanical power, a source of electrical power, and an ignition switch, said ignition switch having an ignition off position for stopping the source of mechanical power, an ignition on position for permitting operation of the source of mechanical power after starting thereof, and a start position for permitting energization of such starter motor, comprising a relay means for controlling energization of such starter means, remotely operable magnetically responsive switch means for controlling energization of said relay means, said switch means being readily hideable in such vehicle or the like and being responsive to an externally applied magnetic force for operating said switch means to activate said relay means to energize such starter means, magnetic means for applying such magnetic force from a location spaced from said magnetically responsive switch means, coupling means for coupling said relay means to such source through such ignition switch requiring that both said relay means be activated and such ignition switch at the same time be closed in such start position to energize such starter motor, said relay means comprising a normally open relay capable of being activated to energize such starter means only while said magnetically responsive switch means is operated by such magnetic force, said magnetically responsive switch means comprising a normally open switch capable of being operated to closure only while such magnetic force is applied to said magnetically responsive switch means, and said coupling means, said magnetically responsive switch means, and such ignition switch means being cooperably related to require that said relay means will be in its activated state only while both such ignition switch means is closed in its start position and said magnetically responsive switch means is operated by such a magnetic force.

2. The controller of claim 1, said magnetically responsive switch means comprising a reed switch.

3. The controller of claim 1, said magnetic means comprising a magnet.

4. The controller of claim 1, wherein such starter means includes a starter relay, wherein said coupling means comprises means for connecting the start position of such ignition switch, said switch means and said relay means in a series circuit, wherein said relay means has normally open contacts closable upon energization of said relay means, and said coupling means further comprises means for connecting such start position of such ignition switch, said contacts and such starter relay in a series circuit.

5. The controller of claim 1, said coupling means including means for coupling said switch means and relay means in a circuit that is in parallel with a circuit of said contacts and such starter relay.

6. A secretive power controller for a vehicle or the like having controllable starter means for starting the vehicle source of mechanical power, such starter means including a starter motor means energizable for starting the source of mechanical power, a source of electrical power, and an ignition switch, said ignition switch having an ignition off position for stopping the source of mechanical power, an ignition on position for permitting operation of the source of mechanical power after starting thereof, and a start position for permitting energization of such starter motor, comprising an SCR means for controlling energization of such starter means, remotely operable magnetically responsive switch means for applying a gate signal to said SCR means to activate the same to energize such starter means, said switch means being readily hideable in such vehicle or the like and being responsive to an externally applied magnetic force to activate said SCR means, magnetic means for applying such magnetic force to said switch means from a location spaced from said switch means, means for coupling said SCR means to such source of electrical power through such ignition switch to require that said SCR means be activated by said switch means only while such ignition switch is closed in such start position to energize such starter motor, and further coupling means for coupling said switch means to such source of electrical power through such ignition switch to require that a gate signal be provided to said SCR to actuate the same only while such ignition switch is closed in such start position, and said switch means has been operated at least briefly by such a magnetic force while such ignition switch is closed.

7. The controller of claim 6, said magnetically responsive switch means comprising a reed switch.

8. The controller of claim 6, said magnetic means comprising a magnet.

9. The controller of claim 6, wherein such starter means includes a starter relay, wherein said coupling means includes means for connecting the start position of such ignition switch, said switch means and the gate terminal of said SCR means in a series circuit, and said coupling means further comprises means for connecting such start position of such ignition switch, the anode/gate terminals of said SCR means, and such starter relay in a series circuit.

10. The controller of claim 9, said coupling means comprising means for connecting said switch means between the gate terminal of said SCR means and the anode of said SCR means.

* * * * *